United States Patent
Boody (10) Patent No.: US 11,629,878 B2
(45) Date of Patent: Apr. 18, 2023

(54) HVAC SYSTEM FOR ENHANCED SOURCE-TO-LOAD MATCHING IN LOW LOAD STRUCTURES

(71) Applicant: Scientific Environmental Design, Inc., High Point, NC (US)

(72) Inventor: Harry Boody, Jamestown, NC (US)

(73) Assignee: Scientific Environmental Design, Inc., High Point, NC (US)

( * ) Notice: Subject to any disclaimer, the term of this patent is extended or adjusted under 35 U.S.C. 154(b) by 0 days.

(21) Appl. No.: 16/968,016

(22) PCT Filed: Feb. 6, 2019

(86) PCT No.: PCT/US2019/016931
§ 371 (c)(1),
(2) Date: Aug. 6, 2020

(87) PCT Pub. No.: WO2019/157111
PCT Pub. Date: Aug. 15, 2019

(65) Prior Publication Data
US 2021/0033301 A1    Feb. 4, 2021

Related U.S. Application Data

(60) Provisional application No. 62/626,844, filed on Feb. 6, 2018.

(51) Int. Cl.
*F24F 11/67*     (2018.01)
*F24F 11/70*     (2018.01)
(Continued)

(52) U.S. Cl.
CPC .............. *F24F 11/67* (2018.01); *F24F 11/70* (2018.01); *F24F 11/50* (2018.01);
(Continued)

(58) Field of Classification Search
CPC .. F24F 11/67; F24F 11/70; F24F 11/50; F24F 2110/10; G05B 2219/2614; G05D 23/1917
(Continued)

(56) References Cited

U.S. PATENT DOCUMENTS 3,805,541 A    4/1974    Hosoda et al.
5,140,830 A    8/1992    Sawyer
(Continued)

OTHER PUBLICATIONS

Gibson, Scott. "Putting the Duct Back in Ductless Mini-Splits." Blog Post. Oct. 3, 2013. Viewed online Dec. 21, 2018 at https://www.buildinggreen.com/news-article/putting-duct-back-ductless-mini-splits.
(Continued)

*Primary Examiner* — Jigneshkumar C Patel
(74) *Attorney, Agent, or Firm* — Gregory Finch; Finch Paolino, LLC (57) ABSTRACT

An HVAC system for enhanced source-to-load matching without sacrificing airflow delivery in low load structures. Embodiments of the present disclosure provide for an HVAC system for enhanced source-to-load matching in a low load environment, i.e. dwellings with a BTU/hour capacity of less than 18,000. Prior art HVAC equipment is oversized for dwellings with a BTU/hour capacity of less than 18,000 that are insulated to minimum code requirements. Embodiments of the present disclosure provide for an HVAC system that separates the delivery of airflow (CFM) output from that of the BTU capacity output, thereby enabling a distributed delivery system for optimal source-to-load matching without sacrificing airflow delivery in low load environments. The source-to-load matching enabled by the present disclosure ensures optimal indoor air quality, enhanced comfort for occupants of the dwelling, and
(Continued)

approximately a 60% reduction in heating and cooling costs when compared to prior art HVAC systems.

15 Claims, 7 Drawing Sheets (51) Int. Cl.
F24F 11/50 (2018.01)
F24F 110/10 (2018.01)
G05D 23/19 (2006.01)

(52) U.S. Cl.
CPC ... *F24F 2110/10* (2018.01); *G05B 2219/2614* (2013.01); *G05D 23/1917* (2013.01)

(58) Field of Classification Search
USPC .......................................................... 700/276
See application file for complete search history.

(56) References Cited

U.S. PATENT DOCUMENTS

| | | | |
|---|---|---|---|
| 5,605,280 A | 2/1997 | Hartman | |
| 6,065,296 A | 5/2000 | Feger | |
| 6,227,961 B1 | 5/2001 | Moore et al. | |
| 10,139,115 B2 | 11/2018 | Lackie et al. | |
| 2003/0059730 A1 | 3/2003 | Sigafus et al. | |
| 2005/0155367 A1 | 7/2005 | Shah | |
| 2006/0154596 A1* | 7/2006 | Meneely | F24F 11/0001 454/256 |
| 2007/0205297 A1 | 9/2007 | Finkam et al. | |
| 2008/0098760 A1* | 5/2008 | Seefeldt | F25B 1/10 62/238.7 |
| 2012/0255720 A1* | 10/2012 | Miller | G05D 23/1931 165/217 |
| 2014/0106660 A1 | 4/2014 | Salerno | |
| 2015/0258488 A1 | 9/2015 | Meirav et al. | |
| 2015/0354874 A1* | 12/2015 | Cur | F24F 13/28 62/216 |
| 2015/0369503 A1 | 12/2015 | Flaherty et al. | |
| 2016/0209064 A1 | 7/2016 | Hrejsa | |

OTHER PUBLICATIONS

International Search Report of the International Searching Authority, International application No. PCT/US2019/016931, dated Apr. 12, 2019. ISA/US, Alexandria, VA.
Written Opinion of the International Searching Authority, International application No. PCT/US2019/016931, dated Apr. 12, 2019. ISA/US, Alexandria, VA.

* cited by examiner

HVAC SYSTEM FOR ENHANCED SOURCE-TO-LOAD MATCHING IN LOW LOAD STRUCTURES

CROSS-REFERENCE TO RELATED APPLICATIONS

The present application claims the benefit of U.S. Provisional Application 62/626,844 filed on Feb. 6, 2018 and entitled "BIFURCATED HVAC SYSTEM FOR ENHANCED SOURCE-TO-LOAD MATCHING IN LOW LOAD STRUCTURES WITHOUT SACRIFICING AIRFLOW DELIVERY," the disclosure of which is hereby incorporated in its entirety at least by reference.

FIELD

The present disclosure relates to the field of heating ventilation and air conditioning (HVAC) systems.

SUMMARY

Certain embodiments of the present disclosure provide for an HVAC system for enhanced source-to-load matching with optimal cubic feet per minute (CFM) airflow delivery comprising a mini-split inverter technology heating and cooling unit. The indoor unit is coupled to a wall of a dwelling, the heating and cooling unit being operable to deliver a variable CFM and British thermal unit (BTU) capacity heating or cooling output to a first interior space of the dwelling in response to a heating or cooling request. The HVAC system of the present disclosure may further comprise an inverter heat pump located outside the dwelling, the heat pump being operably engaged with the heating and cooling unit via a refrigerant line; a return air plenum configured as an interior (mechanical room) closet in the dwelling, the return air plenum having a door comprising a return air grille, the return air plenum being configured to receive the conditioned air and mix it with return air; and, a blower assembly housed inside the return air plenum, the blower assembly comprising a return air intake, a high efficiency filter, an air handling unit, and one or more air supply ducts, the blower assembly being operable to receive the heating or cooling output from the return air plenum closet and transfer the BTU output to one or more interior rooms in the dwelling via one or more air supply ducts.

In one general aspect, the present disclosure comprises an HVAC system comprising one or more air supply ducts, said one or more said air supply ducts comprising at least one primary air supply duct connected to one or more secondary supply ducts. In various embodiments, at least one of said air supply ducts are connected to a terminal unit providing a variable air volume (VAV) to adjust airflow rate. In various embodiments, the terminal unit comprises a controller, a conditioned space temperature sensor, a reheating coil/valve, an indoor air quality (IAQ) sensor, an airflow sensor, a pressure sensor, a discharge air temperature sensor and a motorized damper. In various embodiments, the said controller coordinates the operation of at least one blower, fan, reheating coil/valve, or motorized damper, in conjunction with one or more said temperature, airflow, or pressure sensor. In various embodiments, the blower operates in conjunction with the terminal unit to provide at least one minimum airflow rate to establish a desired user comfort and indoor air quality (IAQ) at a minimum power. In various embodiments, the blower operates under a variable frequency drive (VFD) or variable speed drive (VSD) for source-to-load matching.

According to another general aspect of the present disclosure, an HVAC system comprises a primary electronic controller for coordinating the operation of one or more said components of the HVAC system via one or more secondary controllers. In various embodiments, the one or more controller comprises at least one control module, memory module, communication module, power module, and I/O module. In various embodiments, the primary controller is connected to one or more controllers of a heating and cooling unit, blower, fan, or terminal unit. In various embodiments, the one or more controllers are connected via an I/O module through standard electrical connections or via the communication module implementing at least one wireless communication method, mode, or protocol for transmission and reception of at least one analog or digital signal. In various embodiments, the primary controller is connected, via at least one said signal connection means, to one or more thermostats, optionally a smart thermostat, located within one or more conditioned space. In various embodiments, the controller is capable of transmitting or receiving one or more data input/out from a thermostat. In various embodiments, the primary controller is directly or wirelessly connected to one or more sensors, motor, actuators of one or more said heating and cooling unit, blower, air handler unit, fan, terminal unit, thermostat, heating coil, valve, damper. In various embodiments, one or more controllers execute one or more methods for determining a desired user comfort and indoor air quality (IAQ) at a minimum power for source-to-load matching.

Other general aspects of the present disclosure provide for one or more methods for determining a desired user comfort and indoor air quality (IAQ) at a minimum power for one or more conditioned space. In various embodiments, the method comprises one or more airflow or pressure control sequences. In various embodiments, the one or more control sequences comprises a desired user comfort, heating set point, a cooling set point, a heating and cooling unit setting, or an air handler operation mode. In various embodiments, the one or more control sequences is a heuristic control sequence. In various embodiments, the one or more control sequences provides a minimum air flow rate via modulation of one or more terminal unit damper or reheating coil for determining a desired user comfort and indoor air quality (IAQ) at a minimum power for source-to-load matching.

Another aspect of the present disclosure is an HVAC system kit for enhanced source-to-load matching with proper Cubic Feet per Minute (CFM) airflow delivery comprising at least one mini-split inverter technology heating and cooling unit, an air handler unit, a blower, a fan, a supply plenum, a controller, and software for executing one or more said methods for determining a desired user comfort and indoor air quality (IAQ) at a minimum power for source-to-load matching. In various embodiments, the HVAC system kit comprises one or more proprietary customized device providing one or more of said functions. In various embodiments, the HVAC system kit comprises one or more off-the-shelf device providing one or more said functions. In various embodiments, the HVAC system kit comprises one or more alternative devices capable of providing one or more said function for determining a desired user comfort and indoor air quality (IAQ) at a minimum power for source-to-load matching.

Specific embodiments of the present disclosure provide for an HVAC system comprising an air handler comprising a blower, the air handler being housed in an interior structure defining a return air plenum; an air conditioning unit being housed in the interior structure defining the return air plenum, the air conditioning unit being wall-mounted; and, a controller being operably engaged with the air handler and the air conditioning unit, the controller comprising a temperature sensor, an input-output device, a processor, and a non-transitory memory device being configured to store one or more instructions to cause the processor to perform one or more actions, the one or more actions comprising controlling one or more operations of the air conditioning unit in response to an input by the temperature sensor; controlling one or more operations of the air handler in response to the input by the temperature sensor and a predetermined minimum airflow parameter; and, programming one or more control parameters for the air conditioning unit and the air handler in response to a user-generated input via the input-output device.

Further specific embodiments of the present disclosure provide for an HVAC kit comprising an air handler comprising a blower; a wall-mounted air conditioning unit; and, a control unit comprising a temperature sensor, a processor, and a non-transitory memory device being configured to store one or more instructions to cause the processor to perform one or more actions, the one or more actions comprising controlling one or more operations of the air conditioning unit; controlling one or more operations of the air handler; and, programming one or more control parameters for the air conditioning unit and the air handler.

Still further specific embodiments of the present disclosure provide for an air conditioning method comprising initiating, with a controller, a cooling mode of a wall-mounted air conditioning unit, the wall-mounted air conditioning unit being housed in an interior structure defining a return air plenum; initiating, with the controller, a fan speed of an air handler, the air handler being housed in the interior structure defining the return air plenum; and, distributing, via one or more supply ducts being operably coupled to the air handler, a conditioned air volume from the interior structure defining the return air plenum into one or more interior rooms of a dwelling.

The details of one or more implementations of the present disclosure are set forth in the accompanying drawings and description, below. Other potential features of the disclosure will be apparent from the description and drawings, and from the claims.

BRIEF DESCRIPTION OF DRAWINGS

The above and other embodiments, features and aspects of the present disclosure will be more apparent from the following detailed description taken in conjunction with the accompanying drawings, in which.

DETAILED DESCRIPTION

Certain implementations are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import. Like reference numbers refer to like elements throughout.

Embodiments of the present disclosure provide for a bifurcated HVAC system for enhanced source-to-load matching without sacrificing airflow delivery in low load environments, i.e. dwellings with a BTU/hour ("BTUH") load of less than 18,000. Standard HVAC equipment is often oversized for dwellings insulated to minimum code requirements, with a BTU/hour capacity of less than 18,000. Embodiments of the present disclosure provide for a bifurcated HVAC system that bifurcates the delivery of cubic feet per minute (CFM) airflow output from that of the BTU capacity output, thereby enabling a distributed delivery system for optimal source-to-load matching in low load environments. The bifurcated HVAC system of the present disclosure enables air-to-air heat transfer of energy from the BTU capacity output to the CFM delivery output to enable optimal heating and cooling in all rooms of the dwelling via a single-room heating and cooling unit. The source-to-load matching enabled by the present disclosure ensures optimal indoor air quality, enhanced comfort for occupants of the dwelling, and at least an approximate 60% reduction in heating and cooling costs when compared to prior art HVAC systems.

Embodiments of the present disclosure provide for a bifurcated HVAC system for enhanced source-to-load matching. In accordance with an embodiment, the HVAC system comprises a mechanical closet 48 inches in width by 36 inches (or less) in depth, with a low return air grille incorporated into a closet door to pass the air through. The mechanical closet is configured to function as a return air plenum for the HVAC system of the present disclosure. A wall mounted heating and cooling unit is installed on a wall inside the mechanical closet or on a wall proximal to the mechanical closet. In an embodiment, the wall mounted heating and cooling unit is installed approximately 32 inches above the floor with dimensions of 36 inches wide by 12 inches high by eight inches deep. The wall mounted heating and cooling unit is operably engaged with an outdoor inverter technology heat pump, which may have a load size of one ton or less. A stand-alone vertical air handler is housed in an interior portion of the mechanical closet. The air handler is operable to produce a desired CFM output, for example, of up to 1200 CFM. In an embodiment, a surgical rated filter and PCO air purifier can be attached to the return air end of the air handler.

Upon a demand for heating or cooling the indoor, wall mounted heating and cooling unit is operable to deliver a variable BTUH and CFM output, in conjunction with the outdoor inverter technology heat pump, into the interior space of the mechanical closet. The air handler transfers the BTUH output from the interior space of the mechanical closet, thereby creating a temperature mixing chamber (i.e. return air plenum) within the interior space of the mechanical closet. This provides for air-to-air heat transfer of energy from the BTU capacity output to the CFM delivery output. The air handler draws the mixed air through the filter and transfers it into its respective supply duct system, thereby transferring the variable BTUH output to a higher CFM delivery output.

Figure 1:
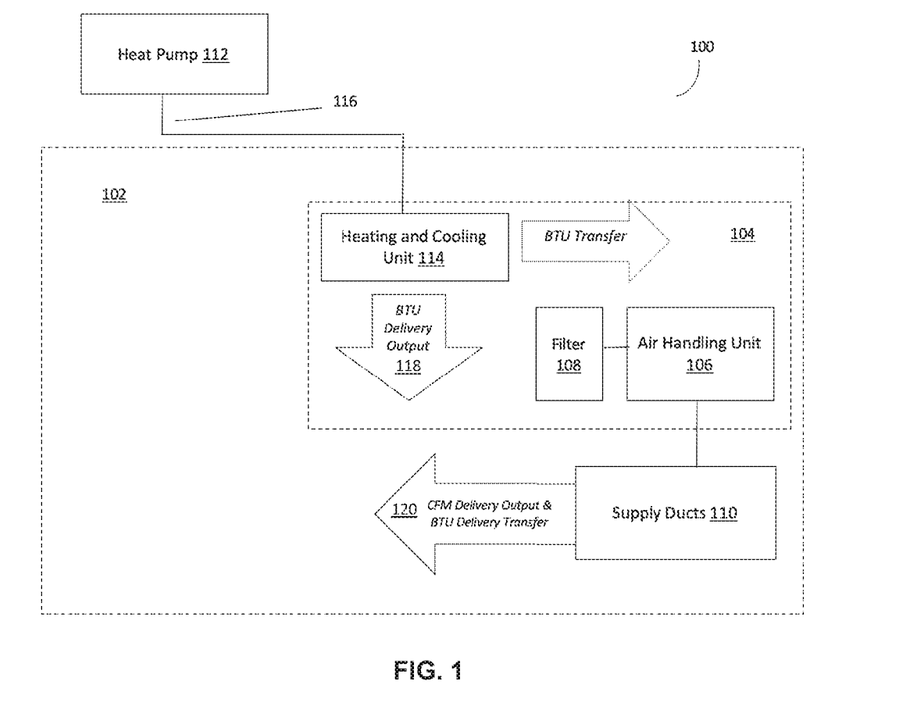
FIG. 1 is a functional diagram of an HVAC system, in accordance with an embodiment of the present disclosure.

Referring now to FIG. 1, a functional diagram of a bifurcated HVAC system 100 for enhanced source to load matching is shown. According to an embodiment, HVAC system 100 is installed in a low-load dwelling 102. Low-load dwelling 102 is defined as a dwelling being under 1400 square feet and having a BTU/hour load of less than 18,000. HVAC system 100 may be generally comprised of heating and cooling unit 114, heat pump 112, return air plenum closet 104, air handling unit 106, filter 108, and supply ducts 110. Heating and cooling unit 114 is a wall mounted unit and is operably engaged with heat pump 112 via refrigerant line 116 to deliver heating and cooling BTU output 118 to the interior space in which heating and cooling unit 114 is located in return air plenum closet 104. Heating and cooling unit 114 is mounted on a wall of dwelling 102 approximately 32 inches above the floor. In an embodiment, heating and cooling unit 114 is configured be 36 inches wide by 12 inches high by eight inches deep. Heat pump 112 is an inverter technology heat pump and may have an exemplary load of one ton or less. In an embodiment, heat pump 112 has a SEER rating of at least 26 and a COP of at least 4. Heat pump 112 may be located at an exterior location of dwelling 102. In an embodiment, heating and cooling unit 114 and heat pump 112 are operable to deliver a heating output ranging from 3,700-21,000 BTUH at 47 degrees (at around 350 CFM output), and cooling output ranging from 2,500-13,600 BTUH. Heating and cooling unit 114 and heat pump 112 are configured to deliver the BTUH output into the return air plenum closet 104.

Air handling unit 106 may be housed in an interior portion of return air plenum closet 104. In an embodiment, return air plenum closet 104 is approximately 48 inches in width by approximately 36 inches (or less) in depth. Return air plenum closet 104 may comprise four walls with a door being 36 inches wide for access; the door having a properly sized low return air grille operable to pass the air therethrough. Air handling unit 106 and return air plenum closet 104 may be operably engaged to define a temperature mixing chamber in the interior portion of return air plenum closet 104. Filter 108 is operably engaged with air handling unit 106 and coupled to a return air intake portion of air handling unit 106. In an embodiment, filter 108 may comprise a surgical-rated Merv 16 filter and PCO air purifier. Air handling unit 106 draws air into return air plenum closet 104 via a blower operable to deliver a desired higher CFM output; for example, 1200 CFM. Air handling unit 106 transfers the BTUH output 118 from heating and cooling unit 114 from the return air plenum closet 104. Air handling unit 106 draws the mixed air from inside return air plenum closet 104 through filter 108 and transfers it into its respective supply duct system 110. In so doing, air handling unit 106 transfers the BTUH output 118 from heating and cooling unit 114 and combines it with the required higher CFM output delivered by air handling unit 106. The resulting integrated BTUH output and CFM delivery output 120 is then directed and delivered to the various rooms of dwelling 102 via supply ducts 110.

Figure 2:
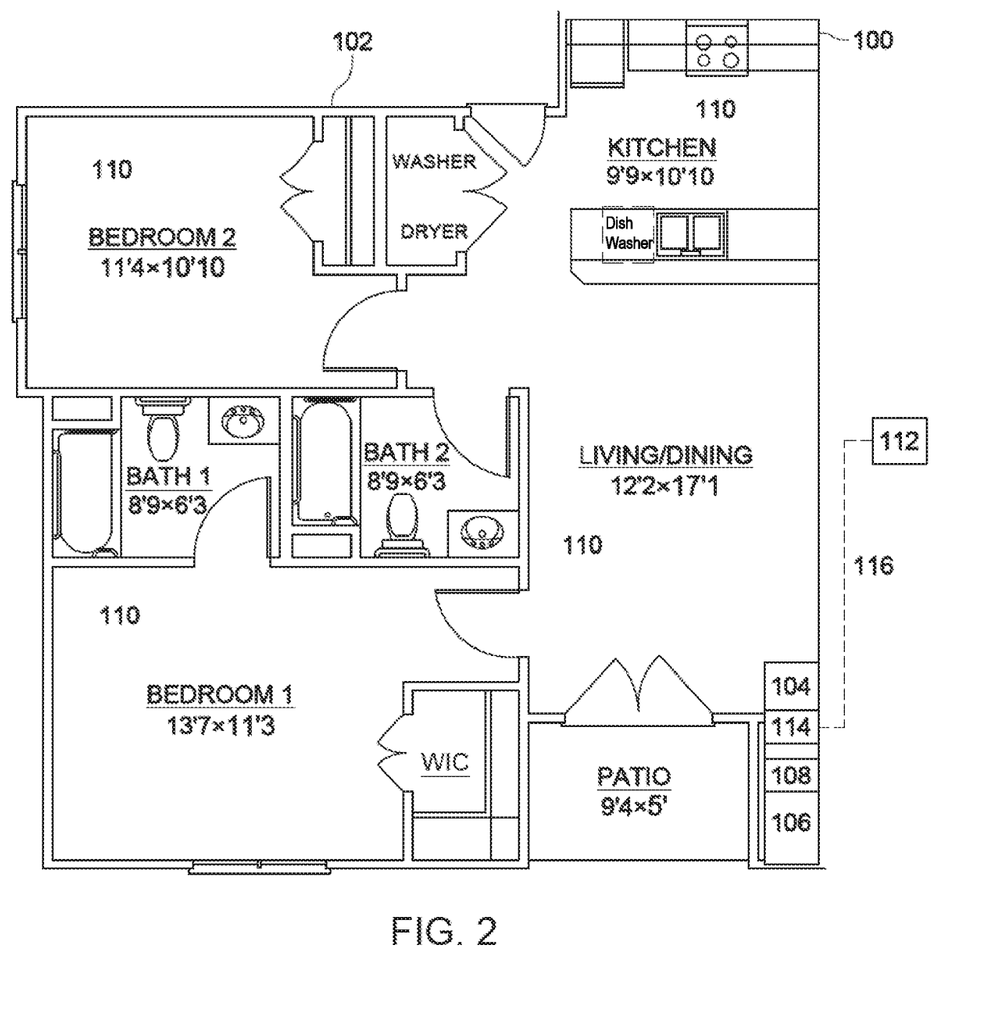
FIG. 2 is a schematic diagram of an HVAC system, in accordance with an embodiment of the present disclosure.

Referring now to FIG. 2, a schematic diagram of a bifurcated HVAC system 100 for enhanced source-to-load matching is shown. As shown in FIG. 2, HVAC system 100 is installed in dwelling 102. According to an embodiment, heating and cooling unit 114 is installed in an interior space of dwelling 102 in an interior portion of, or proximal to, return air plenum closet 104. Air handling unit 106 and filter 108 are housed in an interior portion of return air plenum closet 104. To continue the exemplary embodiment from FIG. 1 above, heating and cooling unit 114 delivers a heating output ranging from 3,700-21,000 BTUH at 47 degrees (at around 350 CFM output), and cooling output ranging from 2,500-13,600 BTUH. Air handling unit 106 removes BTUH output at a CFM rate 120 optimized for dwelling 102, and transfers it into supply ducts 110. In accordance with an embodiment, HVAC system 100 bifurcates the airflow (CFM) delivery output from the BTU capacity output, thereby enabling optimal source-to-load matching and equipment sizing for dwelling 102.

Figure 3:
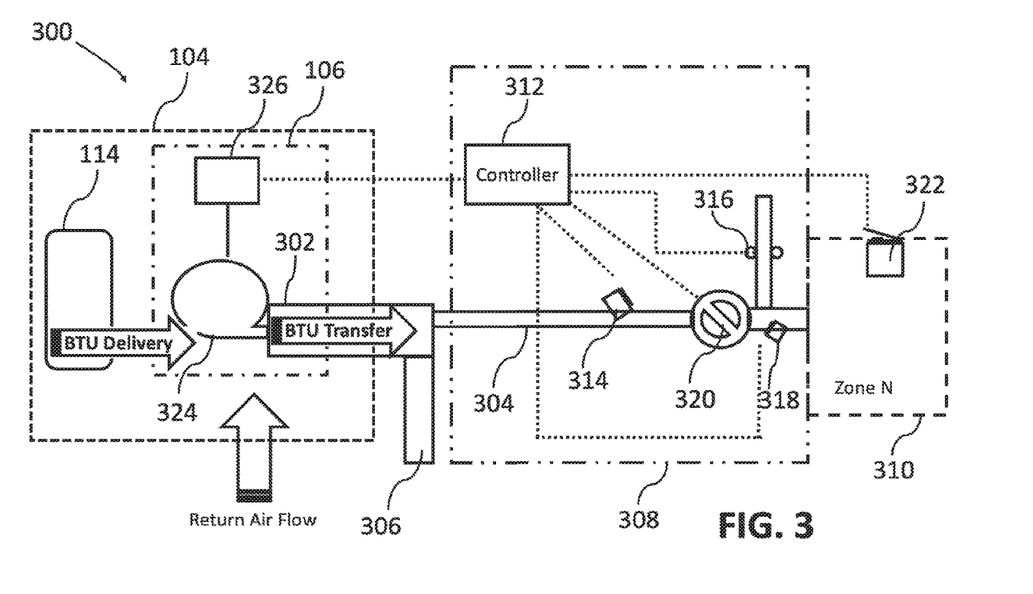
FIG. 3 is a schematic diagram of an HVAC system with an air supply duct connected to a variable air volume (VAV) terminal unit, in accordance with an embodiment of the present disclosure.

Referring to FIG. 3, a functional diagram of a bifurcated HVAC system 300 is shown. In various embodiments, the bifurcated HVAC system 300 comprises at least one primary air supply plenum 302 connected to one or more secondary supply duct 304 and duct 306 (being equivalent to at least one duct of supply ducts 110 of FIG. 1) for delivering at least one CFM delivery output and transfer of at least one BTU output to one or more interior rooms of a dwelling. In various embodiments, supply duct 304 may be connected to a terminal unit 308. Terminal unit 308 may be operable to provide a variable air volume (VAV) to adjust airflow rate and discharge air temperature based on heating/cooling loads and ventilation requirements of a conditioned space 310. In various embodiments, the terminal unit comprises a controller 312, a temperature, airflow or pressure sensor 314, a reheating coil/valve 316, a discharge air temperature sensor 318, a motorized damper 320, a temperature, airflow, or pressure sensor 314, and a thermostat 322. Temperature, airflow, or pressure sensor 314 may be contained within thermostat 322. In various embodiments, upon an input from thermostat 322, controller 312 engages heating and cooling unit 114 to deliver a BTU output into an interior space of return air plenum closet 104. Controller 312 then engages, either subsequently or concurrently with heating and cooling unit 114, air handler 106 to transfer BTU output to supply plenum 302 via blower 324. Further, depending on one or more settings of thermostat 322, controller 312 may operationally engage a reheating coil/valve 316, or motorized damper 320, in conjunction with temperature, airflow, or pressure sensor 314 being housed within duct 304 or located within terminal unit 308 to provide at least one minimum airflow rate, at least one CFM delivery output, or at least one BTU transfer, or combinations thereof to establish a desired user comfort and indoor air quality (IAQ) at a minimum power draw. In various embodiments, controller 312 adjusts damper 320 to provide a desired airflow rate into conditioned space 310. In various embodiments, controller 312 engages reheating coil/valve 316 to provide a desired air temperature to be delivered into conditioned space 310. In various embodiments, controller 312 activates blower 324 timing of operation and speed under a variable frequency drive (VFD) 326 or variable speed drive (VSD) for enhanced source-to-load matching.

Figure 4:
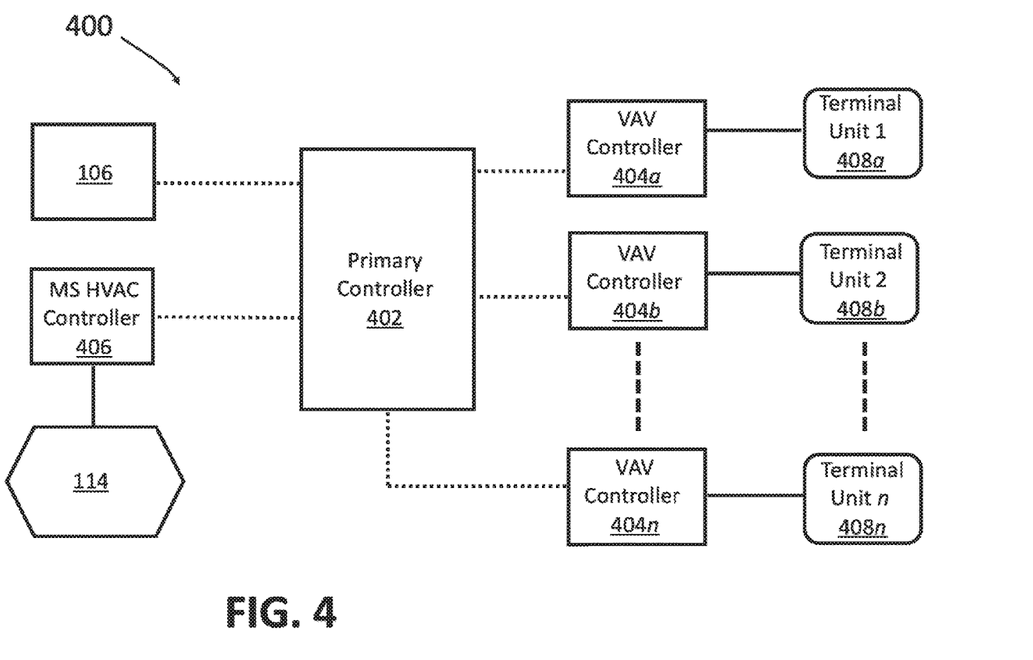
FIG. 4 is a schematic diagram of a control architecture of an HVAC system, in accordance with an embodiment of the present disclosure.

FIG. 4 is a schematic diagram 400 of a control architecture of the bifurcated HVAC system according to the various embodiments of the present disclosure. The control architecture comprises a primary controller 402 for coordinating the operation of heating cooling unit 114, air handler 106, and secondary VAV controllers 404*a-n* being configured to control a corresponding terminal unit 408*a-n*. In various embodiments, primary controller 402 and secondary VAV controllers 404*a-n* comprise at least one control module, having a microcontroller or a microprocessor, memory module (e.g., ROM, RAM, etc.), a communication module (e.g. WIFI, Bluetooth, etc.), a power module (e.g., rechargeable battery), and an I/O module (e.g., USB, etc.). In various embodiments, primary controller 402 is operably engaged with controller 406 of heating and cooling unit 114 to coordinate one or more operations of heating and cooling unit 114, including timing, duration, and volume for BTU delivery by heating and cooling unit 114. In various embodiments, primary controller 402 is operably engaged with air handler 106 to coordinate timing, duration, and amount of delivery of air flow volume and BTU transfer into said supply ducts 110 of FIG. 1. In various embodiments, primary controller 402 is operably engaged with one or more VAV controller 404*a-n* to coordinate the operation of each corresponding terminal unit 408*a-n*. In various embodiments, primary controller 402 is operably engaged with each of said components via an I/O module through an electrical bus or via a communications module implementing at least one wireless communication method, mode, or protocol for transmission and reception of at least one analog or digital signal. In various embodiments, primary controller 402 is operably engaged with, via at least one signal connection means, thermostat 322 of FIG. 3, optionally a smart thermostat, located within one or more conditioned space 310 of FIG. 3. In various embodiments, controller 402 is configured to send and receive one or more data input/out from thermostat 322 of FIG. 3. In various embodiments, primary controller 402 is directly or wirelessly connected to one or more sensors 314 of FIG. 3; motor or actuators of one or more heating and cooling unit 114 of FIG. 1; blower 324 of FIG. 3; air handler 106; terminal unit 408*a-c*; thermostat 322 of FIG. 3; and/or reheating coil/valve 316 or damper 320 of FIG. 3. In various embodiments, one or more primary controller 402, VAV controller 404*a-n*, or heating and cooling unit controller 406 execute one or more methods for determining a desired user comfort and indoor air quality (IAQ) at a minimum power for source-to-load matching.

An aspect of the present disclosure is one or more methods for determining a desired user comfort and indoor air quality (IAQ) at a minimum power for one or more conditioned space. In various embodiments, the method comprises one or more airflow or pressure control sequences. In an embodiment, the one or more control sequences are executed by at least one controller to change the state of operation of at least one terminal damper 320 of FIG. 3 and/or at least one reheating coil/valve 316 of FIG. 3 to achieve a desired user comfort and/or indoor air quality (IAQ).

Figure 5:
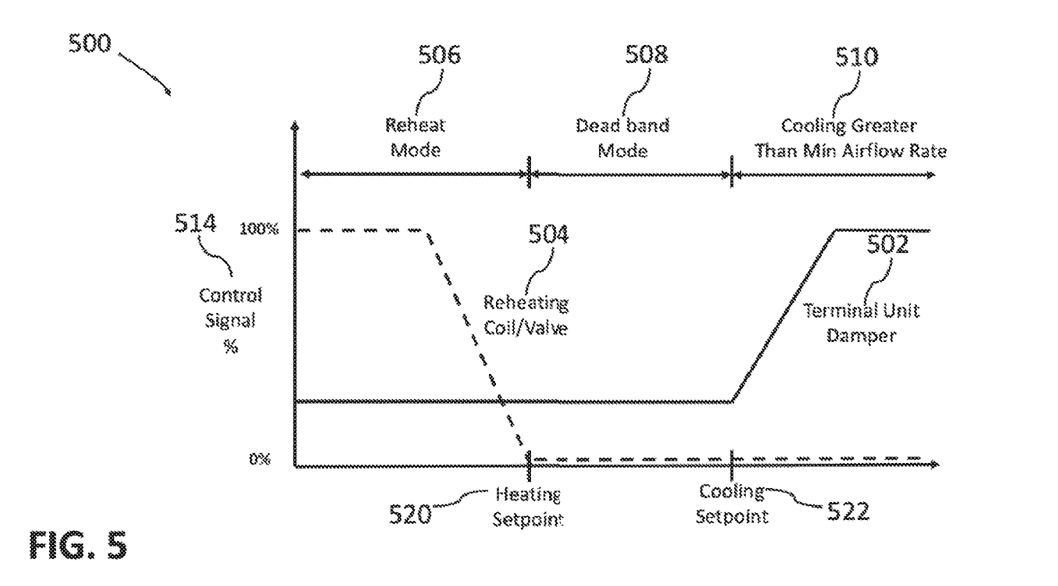
FIG. 5 is a method for controlling a terminal unit damper and/or reheating coil/valve represented by a control signal graph, in accordance with an embodiment of the present disclosure.

Referring now to FIG. 5, a method for controlling a terminal unit damper and/or reheating coil/valve represented by a control signal graph 500 is shown. In various embodiments, the method of controlling one or more airflow sequence comprises the activation of one or more said damper control signal 502 (solid lines), and optionally of one or more reheating coil/valve control signal 504 (dotted lines), by a controller based on a reheat mode 506, a dead band mode 508 or a cooling mode 510. In various embodiments, terminal unit damper signal 502 is actuated from a control signal percentage 514 range from zero (%) percentage to 100(%) percentage level. In various embodiments, reheating coil/valve signal 506 is at 100(%) percentage level during reheat mode 506 and drops to zero (%) percentage level until at a heating set point 520 where reheating of airflow at a terminal unit is no longer required. In various embodiments, terminal damper signal 502 is set a nominal percentage level to allow airflow into one or more said zone 310 of FIG. 3 during reheat mode 506, and through dead band mode 508. In various embodiments, terminal damper signal 502 is gradually increased linearly from a cooling set point 522 to a 100(%) percentage level whereby cooling of a zone 310 of FIG. 3 is achieved at greater than a minimum airflow rate. In another embodiment, the one or more control sequences is a heuristic control sequence.

Figure 6:
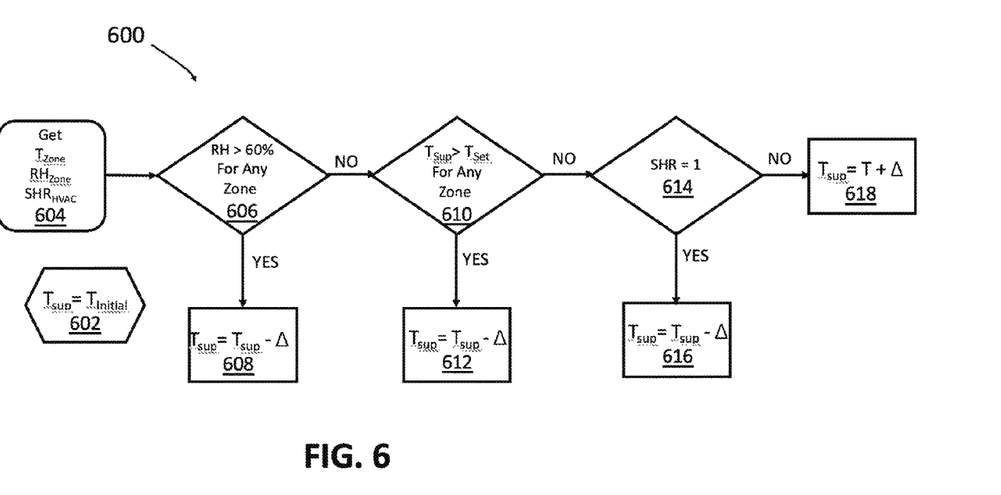
FIG. 6 is a flow diagram of a control sequence for establishing a set point temperature of a zone, in accordance with an embodiment of the present disclosure; and, FIG. 7 is a logic flow diagram for establishing a variable minimum flow rate and discharge air temperature setpoint, in accordance with an embodiment of the present disclosure.

Referring now to FIG. 6, a flow diagram 600 of a control sequence for establishing a set point temperature of one or more zone 310 of FIG. 3 is shown. The control sequence comprises having (step 602) an initial air supply temperature (e.g., 58° F.), measured using one or more temperature sensor 318 of FIG. 3, retrieving (step 604) one or more zone 310 of FIG. 3 temperature, zone 310 of FIG. 3 relative humidity (RH), and the Sensible Heat Ratio (SHR) of heating and cooling unit 114 of FIG. 1. If the RH is determined (step 606) for any zone is greater than 60%, then the initial air supply temperature is lowered (step 608) by a differential value (Δ). In various embodiments, differential value may be one or more degree, including but not limited to, 0° F. to 50° F., preferably in increments of 1-5° F., more preferably determined by one or more control parameter implemented by one or more controller. If the RH determined in step 606 is not greater than 60%, then the air supply temperature is determined (step 610) whether it is above the set point temperature of a zone 310 of FIG. 3. If YES, then the air supply temperature is lowered (step 612) by said a differential value (Δ). If NO, then a determination (step 614) of the SHR of heating and cooling unit 114 of FIG. 1 is made whether it is equal to 1. If YES, then the air supply temperature is lowered (step 616) by said a differential value (Δ). If NO, then the air supply temperature is raised (step 618) by said a differential value (Δ). In various embodiments, said heuristic control sequence enables the setting of one or more desired user comfort and indoor air quality (IAQ) at a minimum power for one or more conditioned space. In another embodiment, the one or more control sequences provide a minimum air flow rate via modulation of one or more terminal unit damper or reheating coil, and/or modulation of the blower speed of the air handler.

Figure 7:
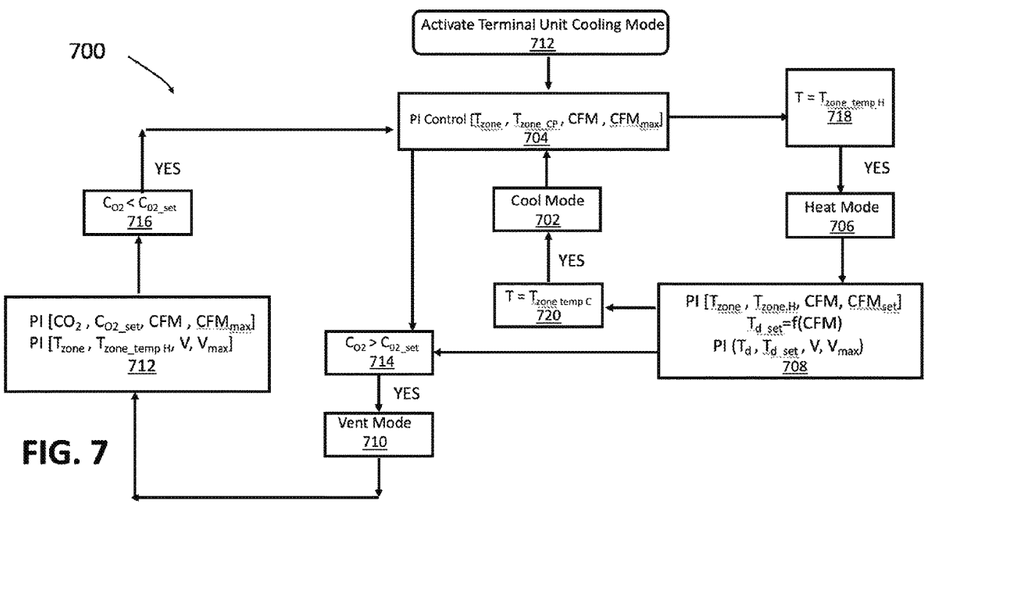

Referring to FIG. 7, a flow diagram of a routine 700 for establishing a variable minimum air flow rate and discharge air temperature setpoint is shown. The algorithm comprises a cooling mode 702 whereby the reheating coil/valve 316 of FIG. 3 is closed and a zone 310 of FIG. 3 room temperature cooling setpoint is maintained by modulating a damper 320 of FIG. 3 position, using a Proportional-Integral (PI) controller 704. In various embodiments, the input for PI controller 704 comprises one or more $T_{zone}$, $T_{zone\_Cooling\ Set\ Point\ (CP)}$, CFM, $CFM_{max}$ parameters. Routine 700 comprises a heating mode 706 whereby the room temperature heating setpoint is maintained by modulating a damper 320 of FIG. 3 position using one or more controller, including but not limited to, a Proportional-Integral (PI) controller 708. In various embodiments, the input for the PI controller comprises one or more $T_{zone}$, $T_{zone\_Heat}$, CFM, $CFM_{set}$, $T_{discharge\ (d)}$, $T_{d\_set}$, V (valve opening), $V_{max}$ parameters. In an embodiment, the damper position is set as the minimum airflow rate setpoint and the discharge air temperature is maintained by modulating the reheating coil/valve 316 of FIG. 3 position. Routine 700 further comprises a ventilation mode 710 whereby a $C_{O2}$, concentration setpoint is maintained by modulating a damper position, and a zone room temperature setpoint is maintained by modulating the reheating coil/valve via PI controller 712. In various embodiments, an input for the PI controller 712 comprises one or more $CO_2$, $C_{O2\_set}$, CFM, $CFM_{max}$, $T_{zone}$, $T_{zone\_temp\_H}$, V, $V_{max}$ parameters. In various embodiments, an activation (step 712) of a terminal unit 308 of FIG. 3 commences a cooling mode. The zone temperature cooling setpoint ($T_{zone\_CP}$) is maintained by modulating a damper position. In various embodiments, in the cooling mode, PI controller 712 queries (step 714) whether the $C_{O2}$ concentration is higher than the setpoint. If YES, then the terminal unit is switched to the ventilation mode 710. In various embodiments, the controller modulates the damper position to maintain the $C_{O2}$ concentration setpoint, and the zone 310 of FIG. 3 room temperature setpoint is maintained by modulating reheating valve/coil. During ventilation mode 710, controller 712 queries (step 716) the $C_{O2}$ concentration and if the $C_{O2}$ concentration is below the setpoint, the terminal unit is switched from ventilation mode 710 to cooling mode 702. If room temperature reaches the heating setpoint (step 718), the terminal unit is switched from the cooling mode 702 to the heating mode 706. In various embodiments, the zone 310 of FIG. 3 room temperature heating setpoint is maintained by modulating the damper 320 of FIG. 3 position. Damper 320 of FIG. 3 position is modulated to maintain the minimum heating airflow rate setpoint and the discharge air temperature is maintained by modulating the reheating valve/coil 316 of FIG. 3 position. The discharge air temperature setpoint is determined by the minimum heating airflow rate setpoint. In various embodiments, in heating mode 706, the controller queries whether a reheating valve is fully closed (Vmax) and the room temperature reaches the cooling setpoint (step 720). In various embodiments, when the reheating valve is fully closed, the terminal unit is switched from the heating mode 706 to the cooling mode 702. In various embodiments, when the $C_{O2}$ concentration is determined to be greater than the setpoint (step 714), the terminal unit is switched to the ventilation mode 710. In various embodiments, the said control algorithms enable automated control of the minimum heating airflow rate and discharge air temperature to maintain optimal IAQ and acceptable air circulation and ventilation in conjunction with one or more $C_{O2}$ sensors or one or more IAQ sensor or one or more thermostat 322 of FIG. 3, preferably with minimum energy usage.

An object of the present disclosure is a bifurcated HVAC system kit for enhanced source-to-load matching with proper cubic feet per minute (CFM) airflow delivery comprising at least one mini-split inverter technology heating and cooling unit, an air handler unit, a supply plenum, and a controller configured to independently operate the heating and cooling unit and the air handler unit to enable a bifurcated delivery of BTU output and CFM output. In various embodiments, a bifurcated HVAC system kit comprises one or more individual primary controller 402, VAV controller 404*a-n*, or MS HVAC controller 406 of FIG. 4 and instructions for configuring the independent and/or combined operation of one or more said controller, one or more HVAC system, HVAC components, or the like, to execute one or more function, algorithm, control methods, or combinations thereof of the present disclosure. In various embodiments, a bifurcated HVAC system kit enables primary controller 402 of FIG. 4 to operate with one or more controller 406 of FIG. 4 of heating and cooling unit 114 of FIG. 1 to execute one or more function, algorithm, control methods, or combinations thereof of the present disclosure. In various embodiments, a bifurcated HVAC system kit enables primary controller 402 of FIG. 4 to send one or more control instructions to MS HVAC controller 406 of FIG. 4 to execute one or more said function, control methods, algorithms, or combinations thereof of the present disclosure. In various embodiments, a bifurcated HVAC system kit enables primary controller 402 of FIG. 4 to receive one or more feedback signals from MS HVAC controller 406 to execute one or more said control methods or algorithms of the present disclosure. In various embodiments, a bifurcated HVAC system kit comprises one or more proprietary customized device providing one or more said function, algorithm, control methods, or combinations thereof of the present disclosure. In various embodiments, a bifurcated HVAC system kit comprises one or more component, device, or systems providing one or more said function, algorithm, control methods, or combinations thereof of the present disclosure for retrofitting an existing residential system. In various embodiments, a bifurcated HVAC system kit comprises one or more off-the-shelf device providing one or more said functions. In various embodiments, a bifurcated HVAC system kit comprises instructions for the modification of one or more off-the shelf device, including but not limited to, installing one or more said controller, primary controller 402, VAV controller 404*a-n*, MS HVAC controller 406 of FIG. 4, or combinations thereof within one or more said off-the-shelf device. In various embodiments, a bifurcated HVAC system kit comprises one or more alternative devices capable of providing one or more of said functions for determining a desired user comfort and indoor air quality (IAQ) at a minimum power for source-to-load matching.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An HVAC system comprising:
   an air handler comprising a blower, wherein the air handler is housed in an interior structure defining a return air plenum;
   an air conditioning unit housed in the interior structure defining the return air plenum, wherein the air conditioning unit is wall-mounted; and
   a controller being operably engaged with the air handler and the air conditioning unit, the controller comprising a temperature sensor, an input-output device, a processor, and a non-transitory memory device configured to store one or more instructions to cause the processor to perform one or more actions, the one or more actions comprising:
   controlling one or more operations of the air conditioning unit in response to an input by the temperature sensor;
   controlling one or more operations of the air handler in response to the input by the temperature sensor and a predetermined minimum airflow parameter for the blower;

programming one or more control parameters for the air conditioning unit and the air handler in response to a user-generated input via the input-output device, and independently controlling a variable BTU output of the air conditioning unit and a cubic feet per minute delivery output of the air handler, wherein the variable cubic feet per minute delivery output of the air handler is configured to transfer the variable BTU output of the air conditioning unit from the interior structure defining the return air plenum to the one or more interior rooms of the dwelling via at least one supply air duct operably coupled to the air handler, wherein the variable BTU output of the air conditioning unit is bifurcated from the cubic feet per minute delivery output of the air handler.

2. The HVAC system of claim 1 further comprising a heat pump operably engaged with the air conditioning unit.

3. The HVAC system of claim 1 wherein the air conditioning unit is a through-wall or window-mounted air conditioning unit.

4. The HVAC system of claim 1 further comprising an airflow sensor operably engaged with the controller.

5. The HVAC system of claim 4 wherein the one or more actions further comprise modulating the blower speed of the air handler in response to an input by the airflow sensor.

6. The HVAC system of claim 1 further comprising a motorized damper operably coupled to the supply duct.

7. The HVAC system of claim 6 wherein the one or more actions further comprise modulating the motorized damper.

8. An HVAC kit comprising:
an air handler comprising a blower;
a wall-mounted air conditioning unit; and
a control unit comprising a temperature sensor, a processor, and a non-transitory memory device configured to store one or more instructions to cause the processor to perform one or more actions, the one or more actions comprising:
controlling one or more operations of the air conditioning unit in response to an input by the temperature sensor;
controlling one or more operations of the air handler in response to the input by the temperature sensor and a predetermined minimum airflow parameter for the blower;
programming one or more control parameters for the air conditioning unit and the air handler; and
independently controlling a variable BTU output of the air conditioning unit and a cubic feet per minute delivery output of the air handler,
wherein the variable cubic feet per minute delivery output of the air handler is configured to transfer the variable BTU output of the air conditioning unit from the interior structure defining the return air plenum to the one or more interior rooms of the dwelling via at least one supply air duct operably coupled to the air handler,
wherein the variable BTU output of the air conditioning unit is bifurcated from the cubic feet per minute delivery output of the air handler.

9. The HVAC kit of claim 8 further comprising a heat pump.

10. The HVAC kit of claim 8 further comprising at least one motorized damper configured to be installed in an air duct.

11. An air conditioning method comprising:
initiating, with a controller, a cooling mode of a wall-mounted air conditioning unit, wherein the wall-mounted air conditioning unit is housed in an interior structure defining a return air plenum;
initiating, with the controller, a fan speed of an air handler, wherein the air handler is housed in the interior structure defining the return air plenum;
independently modulating, with the controller, a variable BTU output of the wall-mounted air conditioning unit and a variable cubic feet per minute delivery output of the air handler, and
distributing, via one or more supply ducts operably coupled to the air handler, a conditioned air volume from the interior structure defining the return air plenum into one or more interior rooms of a dwelling,
wherein the variable cubic feet per minute delivery output of the air handler is configured to transfer the variable BTU output of the air conditioning unit from the interior structure defining the return air plenum to the one or more interior rooms of the dwelling via at least one supply air duct operably coupled to the air handler,
wherein the variable BTU output of the air conditioning unit is bifurcated from the variable cubic feet per minute delivery output of the air handler.

12. The air conditioning method of claim 11 further comprising measuring, with an airflow sensor, an airflow rate of the air handler.

13. The air conditioning method of claim 12 further comprising modulating, with the controller, the fan speed of the air handler in response to the airflow rate.

14. The air conditioning method of claim 11 further comprising measuring, with an indoor air quality sensor, one or more indoor air quality metrics.

15. The air conditioning method of claim 14 further comprising modulating, with the controller, the cooling mode of the wall-mounted air conditioning unit or the fan speed of the air handler in response to the one or more indoor air quality metrics.

* * * * *